(12) United States Patent
Bier et al.

(10) Patent No.: US 7,250,219 B2
(45) Date of Patent: *Jul. 31, 2007

(54) MULTILAYERED ARTICLE AND A PROCESS FOR ITS PREPARATION

(75) Inventors: Peter Bier, Krefeld (DE); Peter Capellen, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 363 days.

This patent is subject to a terminal disclaimer.

(21) Appl. No.: 10/673,906

(22) Filed: Sep. 29, 2003

(65) Prior Publication Data

US 2004/0131867 A1    Jul. 8, 2004

(30) Foreign Application Priority Data

Oct. 1, 2002    (DE) ............................... 102 45 725

(51) Int. Cl.
B32B 27/06 (2006.01)
B32B 7/02 (2006.01)
B32B 7/04 (2006.01)

(52) U.S. Cl. ...................... 428/447; 428/448; 427/377; 427/379; 427/387; 427/402; 427/419.2

(58) Field of Classification Search ...................... None
See application file for complete search history.

(56) References Cited

U.S. PATENT DOCUMENTS

| | | | | |
|---|---|---|---|---|
| 4,753,827 A | * | 6/1988 | Yoldas et al. ................ | 427/387 |
| 5,742,119 A | * | 4/1998 | Aben et al. .................. | 313/479 |
| 6,051,310 A | * | 4/2000 | Cano et al. .................. | 428/336 |
| 6,555,236 B1 | * | 4/2003 | Nakamura et al. .......... | 428/447 |
| 6,617,039 B1 | | 9/2003 | Mager et al. ................ | 428/447 |
| 6,673,458 B2 | * | 1/2004 | Mager et al. ................ | 428/450 |
| 6,699,586 B2 | * | 3/2004 | Edelmann et al. .......... | 428/447 |
| 6,855,396 B1 | * | 2/2005 | Mennig et al. .............. | 428/144 |
| 2004/0131793 A1 | * | 7/2004 | Bier et al. ................... | 427/535 |

FOREIGN PATENT DOCUMENTS

| | | |
|---|---|---|
| CA | 2 388856 | 5/2001 |
| EP | 1 038 907 | 9/2000 |
| WO | WO 01/03901 A1 * | 1/2001 |
| WO | WO 01/30922 * | 5/2001 |

* cited by examiner

*Primary Examiner*—Michael J. Feely
(74) *Attorney, Agent, or Firm*—Joseph C. Gil

(57) ABSTRACT

A multilayered article is disclosed, which includes, in sequence: (1) a substrate (S), e.g., of thermoplastic polycarbonate; (2) a scratch-resistant layer (SR); and (3) a top layer (T). The scratch-resistant layer is prepared by curing a scratch-resistant coating composition comprising a polycondensate prepared from at least one silane, said polycondensate being prepared by a sol-gel process. The top layer is prepared by curing a top layer coating composition prepared by hydrolyzing a composition which includes:

at lest one compound represented by general formula I, $$M(R')_m \qquad (I)$$

wherein M is an element selected from the group consisting of Si, Ti, Zr, Sn, Ce, Al, B, VO, In and Zn, R' represents a hydrolysable radical, and m is an integer from 2 to 4; and optionally at least one compound represented by general formula II, $$R_b SiR'_a, \qquad (II)$$

wherein the radicals R' and R are the same or different, R' is as defined for general formula (I), R represents a group selected from an alkyl group, an alkenyl group, an aryl group, a hydrocarbon group with at least one halogen group, an epoxide group, a glycidyloxy group, an amino group, a mercapto group, a methacryloxy group and a cyano group, and a and b independently of one another have a value from 1 to 3, provided that the sum of a and b is four.

The multilayered articles are distinguished by possessing outstanding scratch and abrasion resistance.

28 Claims, No Drawings

MULTILAYERED ARTICLE AND A PROCESS FOR ITS PREPARATION

CROSS REFERENCE TO RELATED PATENT APPLICATION

The present patent application claims the right of priority under 35 U.S.C. §119(a)-(d) of German Patent Application No. 102 45 725.5, filed Oct. 1, 2002.

FIELD OF THE INVENTION

The present invention relates to a multilayered article (or layer system) comprising a substrate (S), a scratch-resistant layer (SR) and a top layer (T) and to a process for the preparation of this layer system.

BACKGROUND OF THE INVENTION

With the aid of a sol-gel process it is possible to prepare inorganic-organic hybrid materials by controlled hydrolysis and condensation of alkoxides, of in particular silicon, aluminium, titanium and zirconium.

An inorganic network is built up by a sol-gel process. Organic groups can additionally be incorporated via correspondingly derivatized silicates, and can be utilized on the one hand for functionalization and on the other hand for the formation of defined organic polymer systems. Because of the large number of possible combinations both of the organic and of the inorganic components and because of the high capacity for influencing of the product properties by the preparation process, networks resulting from sol-gel processes typically offer a very wide range of variation. In particular, coating systems can be obtained by means of a sol-gel process and tailor-made to the most diverse profiles of requirements.

Compared with inorganic materials, the layers obtained by sol-gel processes are relatively soft. Even though the inorganic contents of the system provide a high level of crosslinking, the reason for the reduced layer hardness is believed to be due to the small size of the inorganic materials in the system, which reduces the mechanical properties (e.g., hardness and abrasion resistance) of the layers. By the use of filler-containing polymers, the favourable mechanical properties of the inorganic contents can be more fully utilized, since in this case the filler provides inorganic particles having sizes of several micrometers. However, the transparency of the materials is typically lost, and optical uses are typically not possible. The use of small particles of $SiO_2$ (e.g., Aerosils® particles) for the preparation of transparent layers having increased abrasion resistance is possible, but at the low concentrations that are typically employed the abrasion resistance of the layers is unfortunately similar to those of the above-mentioned system. The upper limit of the amount of filler is determined in part by the high surface reactivity of the small particles, which results undesirably in the formation of agglomerations or in increases in viscosity.

DE 199 52 040 A1 discloses substrates with an abrasion-resistant diffusion barrier layer system, wherein the diffusion barrier layer system comprises a hard base layer based on hydrolysable epoxysilanes and a top layer arranged on top. The top layer is obtained by application of a coating sol of tetraethoxysilane (TEOS) and glycidyloxypropyl-trimethoxysilane (GPTS) and curing thereof at a temperature of <110° C. The coating sol is prepared by subjecting TEOS to pre-hydrolysis and condensation with ethanol as the solvent in HCl-acid aqueous solution. GPTS is then stirred into the TEOS prehydrolyzed in this way and the sol is stirred for 5 hours at 50° C. A disadvantage of the coating sol described in this publication is its low storage stability (pot life), as a consequence of which the coating sol must be further processed within a few days after its preparation. A disadvantage of the diffusion barrier layer systems described in this publication is furthermore that these have according to the Taber abrasion test which are unsatisfactory for use in automobile glazing.

SUMMARY OF THE INVENTION

The invention is based on the object of providing an organically modified inorganic layer system which, in its hardness, is significantly superior to that of the materials described in the prior art, and has a high optical transparency. Preparation of the layer system should furthermore be possible with stable coating agent compositions with adequate storage stability which enable variable physical and chemical properties of the surface, such as hydrophilicity or hydrophobicity in combination with oleophobicity, to be established.

In accordance with the present invention, there is provided a multilayered article comprising:

(1) a substrate (S);

(2) a scratch-resistant layer (SR) prepared by curing (or at least partially curing, i.e., partially curing such that reactive groups are still present, or fully curing such that substantially no reactive groups remain) a scratch-resistant coating composition comprising a polycondensate prepared from at least one silane, said polycondensate being prepared by a sol-gel process; and (3) a top layer (T) prepared by curing (or at least partially curing, i.e., partially curing such that reactive groups are still present, or fully curing such that substantially no reactive groups remain) a top layer coating composition prepared by hydrolysing a composition comprising, (a) at lest one compound represented by general formula I,

   (I)

wherein M is an element selected from the group consisting of Si, Ti, Zr, Sn, Ce, Al, B, VO, In and Zn, R' represents a hydrolysable radical, and m is an integer from 2 to 4; and (b) optionally at least one compound represented by general formula II,

   (II)

wherein the radicals R' and R are the same or different, R' is as defined for general formula (I), R represents a group selected from an alkyl group, an alkenyl group, an aryl group, a hydrocarbon group with at least one halogen group, an epoxide group, a glycidyloxy group, an amino group, a mercapto group, a methacryloxy group and a cyano group, and a and b independently of one another have a value from 1 to 3, provided that the sum of a and b is four, wherein said scratch-resistant layer is interposed between said substrate and said top layer.

DETAILED DESCRIPTION OF THE INVENTION

The layer systems according to the invention are distinguished in particular by their top layer (T), which is prepared by a particular preparation process described in more detail below. The layer system is distinguished by an outstanding scratch and abrasion resistance. It is particularly advantageous and practicable in the preparation of the layer system according to the invention that the coating composition employed for the top layer (T)—in contrast to coating compositions known from the prior art—has a high storage stability (pot life) and therefore has outstanding processing properties.

A) Preparation of the Scratch-Resistant Layer (SR)

The scratch-resistant layer (SR) is prepared by application of a coating composition (a scratch-resistant coating composition) to a substrate (S), the coating composition comprising a polycondensate, prepared by the sol-gel process, based on at least one silane, and at least partial curing thereof. The preparation of such scratch-resistant layers (SR) on a substrate (S) is known in principle to the skilled artisan.

The choice of the substrate materials (S) for coating is not limited. The compositions are preferably suitable for coating wood, textiles, paper, stoneware, metals, glass ceramic and plastics, and here in particular for coating thermoplastics, such as are described in Becker/Braun, Kunststofftaschenbuch, Carl Hanser Verlag, Munich, Vienna 1992. The compositions are very particularly suitable for coating transparent thermoplastics, and preferably polycarbonates. In particular, spectacle lenses, optical lenses, automobile windows and sheets can be coated with the compositions obtained according to the invention.

The scratch-resistant layer (SR) is preferably formed in a thickness of 0.5 to 30 μm. A primer layer (P) can furthermore be formed between the substrate (S) and the scratch-resistant layer (SR).

Any desired silane-based polycondensates prepared by the sol-gel process are possible as the coating composition for the scratch-resistant layer (SR). Particularly suitable coating compositions for the scratch-resistant layer (SR) include, for example:

A.1) methylsilane systems
A.2) silica sol-modified methylsilane systems,
A.3) silica sol-modified silyl acrylate systems,
A.4) silyl acrylate systems modified with other nanoparticles (in particular boehmite) and
A.5) cyclic organosiloxane systems.

The abovementioned coating compositions for the scratch-resistant layer (SR) are described in more detail in the following:

A.1) Methylsilane Systems

Known methylsilane-based polycondensates, for example, can be employed as the coating composition for the scratch-resistant layer (SR). Polycondensates based on methyltrialkoxysilanes are preferably employed. The coating of the substrate (S) can be carried out, for example, by applying a mixture of at least one methyltrialkoxysilane, an aqueous organic solvent and an acid, evaporating the solvent and curing the silane under the influence of heat to form a highly crosslinked polysiloxane. The solution of the methyltrialkoxysilane preferably comprises the silane to the extent of 60 to 80 wt. %. Methyltrialkoxysilanes which are particularly suitable are those which hydrolyse rapidly, which is the case in particular if the alkoxy group contains no more than four carbon atoms. Suitable catalysts for the condensation reaction of the silanol groups formed by hydrolysis of the alkoxy groups of the methyltrialkoxysilane are, in particular, strong inorganic acids, such as sulfuric acid and perchloric acid. The concentration of the acid catalyst is preferably about 0.15 wt. %, based on the silane. Organic solvents which are particularly suitable for the system comprising methyltrialkoxysilane, water and acid are alcohols, such as methanol, ethanol and isopropanol, or ether-alcohols, such as ethyl glycol. The mixture preferably contains 0.5 to 1 mol of water per mol of silane. The preparation, application and curing of such coating compositions are known to the expert and are described, for example, in the publications DE-A 2 136 001, DE-A 2 113 734 and U.S. Pat. No. 3,707,397.

A.2) Silica Sol-Modified Methylsilane Systems

Polycondensates based on methylsilane and silica sol can furthermore be employed as the coating composition for the scratch-resistant layer (SR). Particularly suitable coating compositions of this type are polycondensates, prepared by the sol-gel process, of substantially 10 to 70 wt. % silica sol and 30 to 90 wt. % of a partly condensed organoalkoxysilane in an aqueous/organic solvent mixture. Particularly suitable coating compositions include the thermosetting, primer-free, silicone hardcoat compositions described in U.S. Pat. No. 5,503,935, which include, based on weight, (A) 100 parts of resin solids in the form of a silicone dispersion in aqueous/organic solvents with 10 to 50 wt. % of solids, and substantially comprising 10 to 70 wt. % colloidal silicon dioxide and 30 to 90 wt. % of a partial condensate of an organoalkoxysilane and (B) 1 to 15 parts of an adhesion promoter, chosen from
    (i) an acrylated polyurethane adhesion promoter with an $\overline{M}_n$ of 400 to 1,500, chosen from an acrylated polyurethane and a methacrylated polyurethane and
    (ii) an acrylic polymer with reactive or interactive sites and an $\overline{M}_n$ of at least 1,000.

Preferred organoalkoxysilanes which can be employed in the preparation of the dispersion of the thermosetting, primer-free silicon hardcoat compositions in aqueous/organic solvents, may be described with reference to the formula, $$(R)_a Si(OR^1)_{4-a},$$

wherein R is a monovalent $C_{1-6}$-hydrocarbon radical, in particular a $C_{1-4}$-alkyl radical, $R^1$ is an R or a hydrogen radical and a in an integer from 0 up to and including 2. The organoalkoxysilane of the above-mentioned formula is preferably methyltrimethoxysilane, methyltrihydroxysilane or a mixture thereof which can form a partial condensate.

The preparation, properties and curing of such thermosetting, primer-free silicone hardcoat compositions are known to the skilled artisan and are described in further detail, for example, in U.S. Pat. No. 5,503,935.

Polycondensates based on methylsilanes and silica sol with a solids content of 10 to 50 wt. % dispersed in a water/alcohol mixture can furthermore be employed as the coating composition for the scratch-resistant layer (SR). The solids dispersed in the mixture comprise silica sol, in particular in an amount of 10 to 70 wt. %, and a partial condensate derived from organotrialkoxysilanes, preferably in an amount of 30 to 90 wt. %, the partial condensate preferably having the formula $R'Si(OR)_3$, wherein R' is chosen from the group consisting of alkyl radicals having 1 to 3 carbon atoms and aryl radicals having 6 to 13 carbon atoms and R is chosen from the group consisting of alkyl radicals having 1 to 8 carbon atoms and aryl radicals having 6 to 20 carbon atoms. The coating composition preferably has an alkaline pH, in particular a pH of 7.1 to about 7.8, which is achieved by a base which is volatile at the curing temperature of the coating composition. The preparation, properties and curing of such coating compositions are known in principle to the skilled artisan and are described, for example, in U.S. Pat. No. 4,624,870.

The abovementioned coating compositions described in U.S. Pat. No. 4,624,870 may be employed in combination with a suitable primer, the primer forming an intermediate layer between the substrate (S) and scratch-resistant layer (SR). Suitable primer compositions include, for example, polyacrylate primers. Suitable polyacrylate primers include those based on polyacrylic acid, polyacrylic esters and copolymers of monomers which may be described with reference to the following general formula,

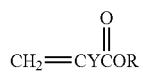

wherein Y represents H, methyl or ethyl and R denotes a $C_{1-12}$-alkyl group. The polyacrylate resin can be thermoplastic or thermosetting and is preferably dissolved in a solvent. A solution of polymethyl methacrylate (PMMA) in a solvent mixture of a fast-evaporating solvent, such as propylene glycol methyl ether, and a more slowly evaporating solvent, such as diacetone alcohol, may be employed, for example, as the acrylate resin solution. Particularly suitable acrylate primer solutions include thermoplastic primer compositions which contain, (A) polyacrylic resin, and 90 to 99 parts by weight of an organic solvent mixture comprising
  (i) 5 to 25 wt. % of a potent solvent with a boiling point of 150 to 200° C. under normal conditions, in which (A) is freely soluble and
  (ii) 75 to 95 wt. % of a weaker solvent with a boiling point of 90 to 150° C. under normal conditions, in which (A) is soluble.

The preparation, properties and drying of the thermoplastic primer compositions mentioned last are known to the skilled artisan and are described in detail, for example, in U.S. Pat. No. 5,041,313, which disclosure is incorporated by reference herein. As already mentioned above, the primer layer is arranged (interposed) between the substrate (S) and the scratch-resistant layer (SR) and serves for adhesion promotion between the two layers.

Further coating compositions for the scratch-resistant layer (SR) based on methylsilane and silica sol are described, for example, in EP 0 570 165 A2, U.S. Pat. Nos. 4,278,804, 4,495,360, 4,624,870, 4,419,405, 4,374,674 and 4,525,426.

A.3) Silica Sol-Modified Silyl Acrylate Systems

Polycondensates based on silyl acrylate may furthermore be employed as the coating composition for the scratch-resistant layer (SR). In addition to silyl acrylate, these coating compositions preferably comprise colloidal silica (silica sol). Possible silyl acrylates include, in particular, acryloxy-functional silanes which may be represented by the following general formula,

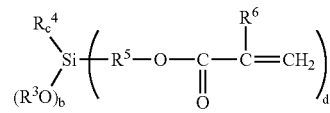

in which $R^3$ and $R^4$ are identical or different monovalent hydrocarbon radicals, $R^5$ is a divalent hydrocarbon radical having 2 to 8 carbon atoms, $R^6$ denotes hydrogen or a monovalent hydrocarbon radical, the index b is an integer having a value from 1 to 3, the index c is an integer having a value from 0 to 2 and the index d is an integer having a value of (4-b-c).

The silyl acrylate coating compositions may optionally further include at least one glycidoxy-functional silane represented by the following general formula,

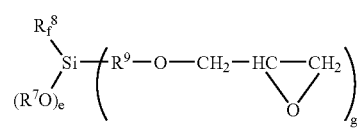

wherein $R^7$ and $R^8$ are identical or different monovalent hydrocarbon radicals, $R^9$ is a divalent hydrocarbon radical having 2 to 8 carbon atoms, the index e is an integer having a value from 1 to 3, the index f is an integer having a value from 0 to 2 and the index g is an integer having a value of (4-e-f), and mixtures thereof.

The preparation and properties of the above-described acryloxy-functional silanes and glycidoxy-functional silanes are known in principle to the skilled artisan and are described, for example in DE 31 26 662 A1. Particularly suitable acryloxy-functional silanes are, for example, 3-methacryloxypropyl-trimethoxysilane, 3-acryloxypropyl-trimethoxysilane, 2-methacryloxyethyl-trimethoxysilane, 2-acryloxyethyltrimethoxysilane, 3-methacryloxypro-pyltri-ethoxy-silane, 3-acryloxypropyltriethoxysilane, 2-methacryloxyethyl-triethoxysilane and 2-acryloxyethyltriethoxysilane. Particularly suitable glycidoxy-functional silanes are, for example, 3-glycidoxypropyltri-methoxysilane, 2-glycidoxyethyltrimethoxysilane, 3-glycidoxypropyl-triethoxysilane and 2-glycidoxyethyltriethoxysilane. These compounds are also described in DE 31 26 662 A1.

The silyl acrylate coating compositions may further include acrylate compounds, in particular hydroxyacrylates, as a further constituent. Further acrylate compounds which may be employed are, for example, 2-hydroxyethyl acrylate, 2-hydroxyethyl methacrylate, 3-hydroxypropyl acrylate, 3-hydroxypropyl methacrylate, 2-hydroxy-3-methacryloxypropyl acrylate, 2-hydroxy-3-acryloxypropyl acrylate, 2-hydroxy-3-methacryloxypropyl methacrylate, diethylene glycol diacrylate, triethylene glycol diacrylate, tetraethylene glycol diacrylate, trimethylolpropane triacrylate, tetrahydrofurfuryl methacrylate and 1,6-hexanediol diacrylate.

Particularly preferred silyl acrylate coating compositions of this type include those which comprise 100 parts by weight of colloidal silica, 5 to 500 parts by weight of silyl acrylate and 10 to 500 parts by weight of further acrylate. In combination with a catalytic amount of a photoinitiator, such coating compositions may be cured, after application to a substrate (S), by UV irradiation to form a scratch-resistant layer (SR), as described in DE 31 26 662 A1. The coating compositions may furthermore comprise conventional additives. The scratch-resistant coatings described in U.S. Pat. No. 5,990,188 which can be cured by irradiation and also comprise, in addition to the abovementioned constituents, a UV absorber, such as triazine or dibenzylresorcinol derivatives are furthermore particularly suitable. Further coating compositions based on silyl acrylates and silica sol are described in U.S. Pat. Nos. 5,468,789, 5,466,491, 5,318,850, 5,242,719 and 4,455,205.

A.4) Silyl Acrylate Systems Modified with other Nanoparticles

Polycondensates based on silyl acrylates which comprise nanoscale AlO(OH) particles, in particular nanoscale boehmite particles, as a further constituent may furthermore be employed as the coating composition for the scratch-resistant layer (SR). Coating compositions which comprise methacryloxypropyltrimethoxysilane and AlO(OH) nanoparticles are possible in particular. Such coating compositions are described, for example, in WO 98/51747 A1, WO 00/14149 A1, DE 197 46 885, U.S. Pat. No. 5,716,697 and WO 98/04604 A1. By addition of photoinitiators, after application to a substrate (S) these coating compositions can be cured by UV rays to form a scratch-resistant layer (SR).

A.5) Cyclic Organosiloxane Systems

Polycondensates based on multifunctional cyclic organosiloxanes may furthermore be employed as the coating composition for the scratch-resistant layer (SR). Multifunctional cyclic organosiloxanes that may be used include, in particular, those represented by the following general formula,

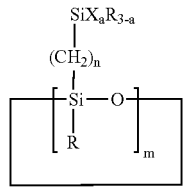

where $m=3$ to 6, preferably 3 to 4, $n=2$ to 10, preferably 2 to 5, particularly preferably 2, $R=C_1$ to $C_8$-alkyl and/or $C_6$ to $C_{14}$-aryl, preferably $C_1$ to $C_2$-alkyl, wherein the m-plurality of n's and R's within the molecule may be identical or different, preferably identical. The further radicals may have the following meaning:

(A) for X=halogen, i.e. Cl, Br, I and F, preferably Cl, where $a=1$ to 3 or X=OR' or OH where $a=1$ to 2, where $R'=C_1$ to $C_8$-alkyl, preferably $C_1$ to $C_2$-alkyl, or (B) for $X=(OSiR_2)_p[(CH_2)_nSiY_aR_{3-a}]$ where $a=1$ to 3, wherein the a within the molecule can be identical or different, preferably identical.
  $p=0$ to 10, preferably $p=0$ and
  Y=halogen, OR' or OH, preferably Cl, OR' or OH, where $R'=C_1$ to $C_8$-alkyl, preferably $C_1$ to $C_2$-alkyl, or (C) $X=(OSiR_2)_p[(CH_2)_nSiR_{3-a}[(CH_2)_nSiY_aR_{3-a}]_a]$ where $a=1$ to 3, wherein the a within the molecule can be identical or different, preferably identical,
  $p=0$ to 10, preferably $p=0$ and
  Y=halogen, OR' or OH, preferably Cl, OR' or OH, where $R'=C_1$ to $C_8$-alkyl, preferably $C_1$ to $C_2$-alkyl.

Multifunctional cyclic organosiloxane compounds, as described above, where $n=2$, $m=4$, R=methyl and X=OH or OR', where R'=methyl or ethyl, and $a=1$ are particularly suitable. The preparation and properties of such multifunctional cyclic organosiloxanes and their use in scratch-resistant coating compositions are known in principle to the skilled artisan and are described, for example, in DE 196 03 241 C1. Further coating compositions based on cyclic organosiloxanes are described, for example, in WO 98/52992, DE 197 11 650, WO 98/25274 and WO 98/38251.

Inert solvents or solvent mixtures may optionally be added at any desired stage of the preparation in order to adjust the rheological properties of the scratch-resistant layer compositions. These solvents are preferably the same as the solvents described for the top layer composition.

The scratch-resistant layer compositions may furthermore comprise conventional additives. Conventional additives include, for example, the additives described below under point B) for the top layer (T).

The application and curing of the scratch-resistant layer composition are each carried out after surface-drying, preferably by means of heat at 50 to 200° C., preferably 70 to 180° C., and in particular 110 to 130° C. Under these conditions the curing time should be less than 120, preferably less than 90, in particular less than 60 minutes.

The layer thickness of the cured scratch-resistant layer (SR) should be 0.5 to 30 μm, preferably 1 to 20 μm and in particular 2 to 10 μm.

B) Preparation of the Top Layer (T)

The top layer (T) is prepared by application and at least partial curing of a top layer coating composition to the at least partly cured scratch-resistant layer (SR).

The coating composition for the top layer (T) in the layer system according to the invention may be obtained by joint hydrolysis of the compounds of the formulae (I) and (II) described in more detail above.

It has been found, surprisingly, that by the proposed joint hydrolysis of the compounds of the formulae I and II the storage stability (pot life) of the coating composition for the top layer (T) can be improved considerably.

The hydrolysis of the compounds of the formulae I and II is preferably carried out in the presence of at least 0.6 mol of water, in particular 0.8 to 2.0 mol of water, based on 1 mol of hydrolysable radicals R'. According to a further preferred embodiment of the invention, a complete hydrolysis is carried out by using at least an equimolar amount of water, based on the hydrolysable radicals.

The compounds of the formulae I and II can be employed in any desired amounts. The compound of the formula II is preferably employed in an amount of less than 0.7 mol, in particular less than 0.5 mol, based on 1 mol of the compound of the formula I.

The hydrolysis is preferably carried out in the presence of acids, in particular aqueous hydrochloric acid. A pH of the reaction mixture of <6, in particular 2.0 to 5.0, is particularly suitable.

The hydrolysis reaction as a rule proceeds slightly exothermically and is preferably assisted by heating to 30 to 40° C. When the hydrolysis has taken place, the reaction product is preferably cooled to room temperature and stirred for some time, in particular 1 to 3 hours, at room temperature. The coating composition obtained is preferably stored at temperatures of <10° C., in particular at a temperature of about 4° C.

All the temperature data, as described herein and in the claims, include a deviation of ±2° C. Room temperature is understood as meaning a temperature of 20 to 23° C.

The coating sol for the top layer (T) is prepared from 100 parts of a compound of the formula I and/or of a hydrolysis product therefrom and of a compound of the formula I and/or of a hydrolysis product therefrom, the amount of the compound II, based on the 100 parts of the compound I, being less than 100 parts, preferably less than 70 parts, in particular less than 50 parts or also being omitted completely. The ready-to-apply top layer coating composition preferably has a solids content of 0.2 to 15 wt. %, in particular 1 to 12 wt. %. Further preferred solids contents of the top layer composition are 0.2 to 5 wt. %, in particular 0.5 to 3 wt. %.

The compound of the formula I is preferably a compound represented by the following general formula, $$M(R')_m$$

wherein M represents a) $Si^{+4}$, $Ti^{+4}$, $Zr^{+4}$, $Sn^{+4}$ or $Ce^{+4}$ or b) $Al^{+3}$, $B^{+3}$, $VO^{+3}$ or $In^{+3}$ or c) $Zn^{+2}$, R' represents a hydrolysable radical and m is 4 in the case of tetravalent elements M [case a)], 3 in the case of trivalent elements or compounds M [case b)], and 2 in the case of divalent elements [case c)]. Preferred elements for M are $Si^{+4}$, $Ti^{+4}$, $Ce^{+4}$ and $Al^{+3}$, and $Si^{+4}$ is particularly preferred.

Examples of the hydrolysable radicals include halogen (F, Cl, Br and I, in particular Cl and Br), alkoxy (in particular $C_{1-4}$-alkoxy, such as e.g. methoxy, ethoxy, n-propoxy, i-propoxy and n-butoxy, i-butoxy, sec-butoxy or tert-butoxy), aryloxy (in particular $C_{6-10}$-aryloxy, e.g. phenoxy), acyloxy (in particular $C_{1-4}$-acyloxy, such as e.g. acetoxy and propionyloxy) and alkylcarbonyl (e.g. acetyl). Particularly preferred hydrolysable radicals include alkoxy groups, in particular methoxy and ethoxy.

Non-limiting examples of compounds represented by formula I which may be employed are recited as follows.
$Si(OCH_3)_4$, $Si(OC_2H_5)_4$, $Si(O\text{-n-}$ or $\text{i-}C_3H_7)_4$,
$Si(OC_4H_9)_4$, $SiCl_4$, $HSiCl_3$, $Si(OOCCH_3)_4$,
$Al(OCH_3)_3$, $Al(OC_2H_5)_3$, $Al(O\text{-n-}C_3H_7)_3$,
$Al(O\text{-i-}C_3H_7)_3$, $Al(OC_4H_9)_3$, $Al(O\text{-i-}C_4H_9)_3$,
$Al(O\text{-sec-}C_4H_9)_3$, $AlCl_3$, $AlCl(OH)_2$, $Al(OC_2H_4OC_4H_9)_3$,
$TiCl_4$, $Ti(OC_2H_5)_4$, $Ti(OC_3H_7)_4$,
$Ti(O\text{-i-}C_3H_7)_4$, $Ti(OC_4H_9)_4$, $Ti(2\text{-ethylhexoxy})_4$;
$ZrCl_4$, $Zr(OC_2H_5)_4$, $Zr(OC_3H_7)_4$, $Zr(O\text{-i-}C_3H_7)_4$, $Zr(OC_4H_9)_4$,
$ZrOCl_2$, $Zr(2\text{-ethylhexoxy})_4$
and Zr compounds which contain complexing radicals, such as e.g. β-diketone and methacryl radicals,
$BCl_3$, $B(OCH_3)_3$, $B(OC_2H_5)_3$,
$SnCl_4$, $Sn(OCH_3)_4$,
$Sn(OC_2H_5)_4$,
$VOCl_3$, $VO(OCH_3)_3$,
$Ce(OC_2H_5)_4$, $Ce(OC_3H_4)_4$, $Ce(OC_4H_9)$, $Ce(O\text{-i-}C_3H_7)_4$, $Ce(2\text{-ethylhexoxy})_4$,
$Ce(SO_4)_2$, $Ce(ClO_4)_4$, $CeF_4$, $CeCl_4$, $CeAc_4$,
$In(CH_3COO)_3$, $In[CH_3COCH=C(O-)CH_3]_3$,
$InBr_3$, $[(CH_3)_3CO]_3In$, $InCl_3$, $InF_3$,
$[(CH_3I_2)CHO]_3In$, $InI_3$, $In(NO_3)_3$, $In(ClO_4)_3$, $In_2(SO_4)_3$, $In_2S_3$,
$(CH_3COO)_2Zn$, $[CH_3COCH=C(O-)CH_3]_2Zn$,
$ZnBr_2$, $ZnCO_3 \cdot 2Zn(OH)_2 \cdot xH_2O$, $ZnCl_2$,
zinc citrate, $ZnF_2$, $ZnI$, $Zn(NO_3)_2 \cdot H_2O$, $ZnSO_4 \cdot H_2O$.

Compounds $SiR_4$, wherein the radicals R can be identical or different and represent a hydrolysable group, preferably an alkoxy group having 1 to 4 carbon atoms, in particular methoxy, ethoxy, n-propoxy, i-propoxy, n-butoxy, i-butoxy, sec-butoxy or tert-butoxy, are particularly preferred.

A tetraalkoxysilane, in particular tetraethoxysilane (TEOS), is very particularly preferred.

The compound of formula II is described in more detail with reference to the following general formula II, $$R_bSiR'_a,\qquad\text{II}$$

wherein the radicals R and R' are identical or different (preferably identical), the R' represent a hydrolysable group (preferably $C_{1-4}$-alkoxy, and in particular methoxy and ethoxy) and the R represent an alkyl group (preferably $C_1$-$C_8$), an alkenyl group (preferably $C_2$-$C_8$), an aryl group (preferably $C_6$-$C_{10}$) or a hydrocarbon group (preferably $C_1$-$C_{20}$) with one or more halogen groups, an epoxide group, a glycidyloxy group, an amino group, a mercapto group, a methacryloxy group or a cyano group.

Subscript
(a) may have a value of 1 to 3, and subscript (b) may have a value 1 to 3, provided that the sum of a+b is four (4).

Examples of compounds represented by formula II include, but are not limited to:
trialkoxysilanes, triacyloxysilanes and triphenoxysilanes, those such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-mercaptopropyltrimethoxysilane, γ-mercaptopropyltriethoxysilane, N-β-(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltrimethoxysilane, β-(3,4-epoxycyclohexyl)ethyltrimethoxysilane, β-(3,4-epoxycyclohexyl)ethyltrimethoxysilane, β-(3,4-epoxycyclohexyl)ethyltripropoxysilane, β-(3,4-epoxycyclohexyl)ethyltributoxysilane, β-(3,4-epoxycyclohexyl)ethyldimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltrimethoxysilane, δ-(3,4-epoxycyclohexyl)butyltrimethoxysilane, δ-(3,4-epoxycyclohexyl)butyltriethoxysilane and hydrolysis products therefrom, and dialkoxysilanes and diacyloxysilanes, such as e.g. dimethyldimethoxysilane, phenylmethyldimethoxysilane, dimethyldiethoxysilane, phenylmethyldiethoxysilane, γ-chloropropylmethyldimethoxysilane, γ-chloropropylmethyld iethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyidiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane, and products and hydrolysis products therefrom.

The above recited examples of compounds represented by general formula II may be used individually or as a mixture of two or more.

Preferred compounds of the formula II include methyltrialkoxysilane, dimethyldialkoxysilane, gycidyloxypropyltrialkoxysilane and/or methacryloxypropyltrimethoxysilane. Particularly preferred compounds of the formula II include glycidyloxypropyltrimethoxysilane (GPTS), methyltriethoxysilane (MTS) and/or methacryloxypropyltrimethoxysilane (MPTS).

Water and/or inert solvents or solvent mixtures may optionally be added at any desired stage of the preparation of the hydrolysis product of the composition of the top layer composition, in particular during the hydrolysis, in order to adjust the rheological properties of the compositions. These solvents are preferably alcohols which are liquid at room temperature, which are moreover also formed during the hydrolysis of the alkoxides preferably employed. The hydrolysis for the preparation of the coating composition for the top layer (T) is preferably carried out in the presence of an alcohol having a boiling point below 120° C. and/or an alkoxy-alcohol as the solvent. Particularly preferred alcohols are $C_{1-8}$-alcohols, in particular methanol, ethanol, n-propanol, i-propanol, n-butanol, i-butanol, tert-butanol, n-pentanol, i-pentanol, n-hexanol and n-octanol. $C_{1-6}$-Glycol ethers, in particular n-butoxyethanol, are also preferred. Isopropanol, ethanol, butanol and/or water is particularly suitable as the solvent.

The compositions of the top layer coating composition may furthermore comprise conventional additives, such as dyestuffs, flow control agents, UV stabilizers, IR stabilizers, fillers, photoinitiators, photosensitizers (if photochemical curing of the composition is intended) and/or thermal polymerization catalysts. Flow control agents include, in particular, those based on polyether-modified polydimethylsiloxanes. It has proved particularly advantageous if the paint compositions comprise flow control agents in an amount of about 0.005 to 2 wt. %. For application of the coating composition for the top layer (T) it is furthermore advantageous if the hydrolysis product of the compounds of the formulae I and II is diluted with alcohols and/or alkoxy-alcohols to a concentration in the coating composition of 0.02 to 10 wt. %, in particular 0.5 to 5 wt. %.

The application of the coating composition prepared in this way for the top layer to the at least partly cured scratch-resistant layer or an intermediate layer optionally arranged on the scratch-resistant layer is carried out—as in the case of application of the coating composition for the scratch-resistant layer (SR)—by standard coating processes, which include, for example, dipping, flow-coating, spreading, brushing, knife-coating, rolling, spraying, falling film application, spin-coating and whirler-coating.

Curing of the applied top layer (T) is typically carried out optionally after prior surface-drying at room temperature. The curing is preferably carried out by means of heat at temperatures in the range from 50 to 200° C., in particular 70 to 180° C. and particularly preferably 90 to 130° C. Under these conditions the curing time should be 30 to 200 minutes, preferably 45 to 120 minutes. The layer thickness of the cured top layer is preferably 0.05 to 5 μm, in particular 0.1 to 3 μm.

If unsaturated compounds and photoinitiators are present, the curing can also be carried out by irradiation, which is optionally followed by after-curing (or post-curing) by means of heat.

The layer systems according to the invention may be prepared by a process which comprises at least the following steps:

(a) application of the scratch-resistant coating composition to the substrate (S) and partial curing or polymerization of the coating composition under condition such that reactive groups are still present.

(b) application of the top layer coating composition according to the invention to the incompletely cured or polymerized scratch-resistant layer (SR) prepared in this way and curing thereof to form a top layer (T).

For the preparation of the layer systems it has proved to be particularly advantageous if the scratch-resistant layer (SR) is dried at a temperature of >110° C., in particular 110 to 130° C., after its application. Excellent abrasion properties of the layer systems can be achieved by this means.

It is furthermore advantageous if the scratch-resistant layer coating composition comprises flow control agents in an amount of 0.01 to 3 wt. %, in particular 0.03 to 1 wt. %.

It has furthermore proved to be particularly advantageous if the top layer coating composition is applied at a relative humidity of 50 to 75%, in particular 55 to 70%.

Finally, it has proved to be advantageous if the cured scratch-resistant layer (SR) is activated before application of the top layer coating composition. Possible activation processes include, but are not limited to, corona treatment, flaming, plasma treatment or chemical etching. Flaming and corona treatment are particularly suitable. Reference is made to the embodiment examples in respect of the advantageous properties.

The present invention is more particularly described in the following examples, which are intended to be illustrative only, since numerous modifications and variations therein will be apparent to those skilled in the art. Unless otherwise specified, all parts and percentages are by weight.

EXAMPLES

Preparation of the Coating Composition for the Scratch-Resistant Layer (SR)

Example 1

203 g methyltrimethoxysilane were mixed with 1.25 g glacial acetic acid. 125.5 g Ludox® AS (ammonium-stabilized colloidal silica sol from DuPont, 40% $SiO_2$ with a silicate particle diameter of about 22 nm and a pH of 9.2) were diluted with 41.5 g deionized water in order to adjust the $SiO_2$ content to 30 wt. %. This material was added to the acidified methylthmethoxysilane, while stirring. The solution was stirred for a further 16 to 18 hours at room temperature and then added to a solvent mixture of isopropanol/n-butanol in the weight ratio of 1:1. Finally, 32 g of the UV absorber 4-[γ-(tri-(methoxy/ethoxy)silyl)propoxy]-2-hydroxybenzophenone were added. The mixture was stirred for two weeks at room temperature. The composition had a solids content of 20 wt. % and contained 11 wt. % of the UV absorber, based on the solid constituents. The coating composition had a viscosity of about 5 cSt at room temperature.

To accelerate the polycondensation reaction, 0.2 wt. % tetrabutylammonium acetate were mixed in homogeneously before the application.

Example 2 (Primer)

3.0 parts polymethyl methacrylate (Elvacite® 2041 from DuPont) were mixed with 15 parts diacetone alcohol and 85 parts propylene glycol monomethyl ether and the mixture was stirred for two hours at 70° C. until solution was complete.

Example 3

0.4 wt. % of a silicone flow control agent and 0.3 wt. % of an acrylate polyol, namely Joncryl 587 ($M_n$ 4,300) from S.C. Johnson Wax Company in Racine, Wis., were stirred into the coating sol prepared according to example 4. To accelerate the polycondensation reaction, as in example 4 before the application, 0.2 wt. % tetra-n-butylammonium acetate were mixed in homogeneously.

Preparation of the Coating Composition for the Top Layer (T)

Example 4

A mixture of 130.0 g 2-propanol, 159.4 g distilled water and 2.8 g 37% hydrochloric acid was rapidly added dropwise to a mixture of 200.0 g TEOS and 22.0 g MTS in 130.0 g 2-Propanol. An exothermic reaction occurs, which is assisted by heating to 30 to 40° C. The reaction product is then cooled to room temperature and stirred for 1.5 hours. The coating sol obtained is stored under cool conditions at +4° C. Before use, this concentrate is diluted with isopropanol to a solids content of 1 wt. % and 1.0 wt. % of the flow control agent BYK® 347 (based on the solids content) is added.

Example 5

A mixture of 130.0 g 2-propanol, 155.5 g or 150.4 g distilled water and 2.8 g 37% hydrochloric acid was rapidly added dropwise to a mixture of 200.0 g TEOS and 22.0 g or 11.0 g MPTS (example 26 and 29) in 130.0 g 2-Propanol. An exothermic reaction occurs, which is assisted by heating to 30 to 40° C. The reaction product is then cooled to room temperature and stirred for 1.5 hours. The coating sol obtained is stored under cool conditions at +4° C. Before use, this concentrate is diluted with isopropanol to a solids content of 1 wt. % and 1.0 wt. % of the flow control agent BYK® 306 (based on the solids content) is added.

Example 6

A mixture of 130.0 g 2-propanol, 156.8 g distilled water and 2.8 g 37% hydrochloric acid was rapidly added dropwise to a mixture of 200.0 g TEOS and 22.0 g GPTS in 130.0 g 2-Propanol. An exothermic reaction occurs, which is assisted by heating to 30 to 40° C. The reaction product is then cooled to room temperature and stirred for 1.5 hours. The coating sol obtained is stored under cool conditions at +4° C. Before use, this concentrate is diluted with isopropanol to a solids content of 1 wt. % and 1.0 wt. % of the flow control agent BYK 347 (based on the solids content) is added.

Preparation of the Scratch-Resistant Coating Systems

Test pieces were prepared as follows with the coating compositions obtained:

Sheets of polycarbonate based on bisphenol A (Tg=147° C., $M_w$ 27,500) of dimensions 105×150×4 mm were cleaned with isopropanol and, where appropriate, primed by flow-coating with a primer solution. The primer solution (example 2) is only surface-dried here.

The primed polycarbonate sheets were then flow-coated with the base coat coating composition (example 1 or 3). The air-drying time for dust drying was 30 minutes at 23° C. and 63% relative atmospheric humidity. The dust-dry sheets were heated in an oven at 130° C. for 30 minutes and then cooled to room temperature.

Thereafter, the top layer coating composition (example 4, 5 or 6) was applied, also by flow-coating. The wet film was air-dried for 30 minutes at 23° C. and 63% relative atmospheric humidity and the sheets were than heated at 130° C. for 120 minutes.

If the primer-free base coat 3 was used, the primer stage was omitted. In this case the polycarbonate sheets are flow-coated with the coating composition of example 2 directly after the cleaning with isopropanol. The other conditions are analogous.

A surface activation of the cured base coat layer by flaming, corona treatment, brushing or chemical etching etc. proved particularly favourable for improving the adhesion and the flow of the top coat coating composition. The curing time and the content of flow control agent used were furthermore varied for comparison.

After curing had taken place the coated sheets were stored for two days at room temperature and then subjected to the following defined tests.

The properties of the coatings obtained with these paints were determined as follows:

Cross-hatch test: EN ISO 2409:1994

Cross-hatch test after storage in water: 65° C., tt=0/0 The coated sheets are provided with a cross-hatch according to EN ISO 2409:1994 and stored in hot water of 65° C. The storage time (days) from which the first loss of adhesion in the tape test from 0 to 2 occurs is recorded.

Taber Abraser test: Abrasion test DIN 52 347; (1,000 cycles, CS10F, 500 g)

The results of the evaluation are shown in the following tables:

Table 1 shows the abrasion (Taber values) and adhesion properties after storage of the layer systems in water as a function of the scratch-resistant layer (SR) with and without the top layer. Examples 7 and 8 show a considerable improvement in the scratch resistance without a loss of adhesion after storage in water.

TABLE 1

| | Scratch-resistant layer (SR) | Top layer (T) | Taber Abraser test hazing (%) | Cross-hatch test after storage in water (days) |
|---|---|---|---|---|
| Example 7 | Example 1/2 | Example 4 | 2.4 | >14 |
| Example 8 | Example 3 | Example 4 | 2.9 | >14 |
| Comparison example 9 | Example 1/2 | none | 12 | >14 |
| Comparison example 10 | Example 3 | none | 20 | >10 |

Table 2 shows the abrasion properties (Taber values) of the layer systems as a function of the stoving time and temperature of the scratch-resistant layer (SR). The results show that an increase in the stoving time is accompanied by an improvement in the Taber values.

TABLE 2

| | Scratch-resistant layer (SR) | Top layer (T) | Stoving temperature after application of the base coat (° C.) | Stoving time after application of the base coat (min) | Taber Abraser test hazing (%) |
|---|---|---|---|---|---|
| Example 11 | Example 1/2 | Example 4 | 130 | 60 | 2.4 |
| Example 12 | Example 1/2 | Example 4 | 130 | 30 | 5.7 |
| Example 13 | Example 3 | Example 4 | 130 | 60 | 2.9 |
| Example 14 | Example 3 | Example 4 | 130 | 45 | 10.8 |
| Example 15 | Example 3 | Example 4 | 130 | 30 | 8.8 |
| Example 16 | Example 3 | Example 4 | 130 | 15 | 14.3 |
| Example 17 | Example 1/2 | Example 4 | 127 | 15 | 15.5 |
| Example 18 | Example 1/2 | Example 4 | 127 | 30 | 11.1 |
| Example 19 | Example 1/2 | Example 4 | 127 | 45 | 5.0 |

Table 3 shows the abrasion properties (Taber values) of the layer systems as a function of the solids content of the top layer (T). The results show that particularly good Taber values are achieved if the solids content of the top layer is above 0.5 and below 1.5 wt. %.

TABLE 3

| | Scratch-resistant layer (SR) | Top layer (T) | Solids content of the top coat | Taber Abraser test hazing (%) |
|---|---|---|---|---|
| Example 20 | Example 3 | Example 4 | 1.0 | 2.9 |
| Example 21 | Example 3 | Example 4 | 0.8 | 2.1 |
| Example 22 | Example 3 | Example 4 | 1.5 | no adhesion |
| Example 23 | Example 3 | Example 4 | 2.0 | no adhesion |
| Example 24 | Example 3 | Example 4 | 0.5 | 15.7 |
| Example 25 | Example 1/2 | Example 4 | 1.0 | 2.4 |

Table 4 shows the abrasion properties (Taber values) of the layer systems as a function of the type and amount of the flexibilizing agent contained in the top layer coating composition. The flexibilizing agents employed were: glycidyloxypropyltrimethoxysilane (GPTS), methyltriethoxysilane (MTS) and methacryloxypropyltrimethoxysilane (MPTS).

TABLE 4

| | Scratch resistant layer (SR) | Top layer (T) | Flexibilizing agent in the top coat | | Taber Abraser test hazing (%) |
|---|---|---|---|---|---|
| | | | type | content (%) | |
| Example 26 | Example 1/2 | Example 5 | MPTS | 5 | 2.1 |
| Example 27 | Example 1/2 | Example 5 | MPTS | 10 | 4.5 |
| Example 28 | Example 3 | Example 5 | MPTS | 10 | 7.3 |
| Example 29 | Example 3 | Example 5 | MPTS | 5 | 2.3 |
| Example 30 | Example 3 | Example 4 | MTS | 10 | 2.9 |
| Example 31 | Example 3 | Example 6 | GPTS | 10 | 3.0 |

Table 5 shows the abrasion properties (Taber values) of the layer systems as a function of the amount of flow control agent BYK 306 in the top layer coating composition. The results show that the flow control agent BYK 306 in an amount of less than about 1 wt. % in the top layer coating composition has a particularly advantageous effect on the wear properties of the layer system.

TABLE 5

| | Scratch-resistant layer (SR) | Top layer (T) | Amount of flow control agent (%) | Taber Abraser test hazing (%) |
|---|---|---|---|---|
| Example 32 | Example 1/2 | Example 4 | 0.5 | 3.6 |
| Example 33 | Example 1/2 | Example 4 | 0.3 | 2.1 |
| Example 34 | Example 3 | Example 4 | 0.5 | 5.5 |
| Example 35 | Example 3 | Example 4 | 0.3 | 2.9 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multilayered article comprising:
   (1) a substrate (S);
   (2) a scratch-resistant layer (SR) prepared by curing a scratch-resistant coating composition consisting of a polycondensate prepared from at least one silicon-containing compound, said polycondensate being prepared by a sol-gel process, wherein said at least one silicon containing compound is selected from the group consisting of 1) methylsilane; 2) methyltrimethoxysilane, methyltrihydroxysilane and mixtures thereof; 3) silyl acrylates according to the formula

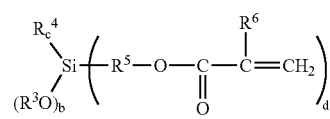

in which $R^3$ and $R^4$ are identical or different monovalent hydrocarbon radicals, $R^5$ is a divalent hydrocarbon radical having 2 to 8 carbon atoms, $R^6$ denotes hydrogen or a monovalent hydrocarbon radical, the index b is an integer having a value from 1 to 3, the index c is an integer having a value from 0 to 2 and the index d is an integer having a value of (4-b-c);
4) silylacrylates comprising nanoscale AlO(OH) particles; and
5) cyclic organosiloxanes according to the formula

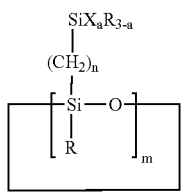

where m=3 to 6, R=$C_1$ to $C_8$-alkyl and/or $C_6$ to $C_{14}$-aryl, wherein the m-plurality of n's and R's within the molecule may be identical or different; and
(3) a top layer (T) prepared by curing a top layer coating composition prepared by hydrolysing a composition consisting of
(a) at least one compound represented by general formula I, $$M(R')_m \qquad (I)$$

wherein M is an element or compound selected from the group consisting of Si, Ti, Zr, Sn, Ce, Al, B, $VO^{3+}$, In and Zn, R' represents a hydrolysable radical, and m is an integer from 2 to 4; and
(b) optionally at least one compound represented by general formula II, $$R_b SiR'_a, \qquad (II)$$

wherein the radicals R' and R are the same or different, R' is as defined for general formula (I), R represents a group selected from an alkyl group, an alkenyl group, an aryl group, a hydrocarbon group with at least one halogen group, an epoxide group, a glycidyloxy group, an amino group, a mercapto group, a methacryloxy group and a cyano group, and a and b independently of one another have a value from 1 to 3, provided that the sum of a and b is four and with the proviso that when a compound of formula II is present, it is not a methyltrimethoxysilane or methyltrihydroxysilane: and
(c) optionally one or more additives selected from the group consisting of water, acid, solvent, dyestuffs, flow control agents, UV stabilizers, IR stabilizers, photoinitiators and photosensitizers,
wherein said scratch-resistant layer is interposed between said substrate and said top layer.

2. The multilayered article of claim 1 wherein said substrate comprises a plastic.

3. The multilayered article of claim 1 wherein the polycondensate of the scratch-resistant coating composition is prepared from methylsilane.

4. The multilayered article of claim 1 wherein the polycondensate of the scratch-resistant coating composition is prepared from a composition comprising 10 to 70 wt. % silica sol, and 30 to 90 wt. % of a partially condensed organoalkoxysilane, in a solvent mixture comprising at least one aqueous solvent and organic solvent.

5. The multilayered article of claim 1 wherein the polycondensate of the scratch-resistant coating composition is prepared from at least one silyl acrylate.

6. The multilayered article of claim 1 wherein the scratch-resistant coating composition further comprises methacryloxypropyl-trimethoxysilane and AlO(OH) nanoparticles.

7. The multilayered article of claim 1 wherein the polycondensate of the scratch-resistant coating composition is prepared from at least one multifunctional cyclic organosiloxane.

8. The multilayered article of claim 1 wherein the hydrolysis of the composition of the top layer coating composition is conducted in the presence of at least 0.6 mole of water, based on 1 mole of hydrolysable radicals R'.

9. The multilayered article of claim 1 wherein during the hydrolysis of the composition of the top layer coating composition, the compound of formula II is present in an amount of less than 0.7 mole, based on 1 mole of the compound of formula I.

10. The multilayered article of claim 1 wherein the hydrolysis of the composition of the top layer coating composition is conducted at a pH of less than 6.0.

11. The multilayered article of claim 1 wherein the solids content of the top layer coating composition is 0.2 to 15 wt. %.

12. The multilayered article of claim 1 wherein the hydrolysis of the composition of the top layer coating composition is conducted in the presence of a solvent selected from at least one of water, an alcohol having a boiling point below 120° C. and an alkoxy-alcohol.

13. The multilayered article of claim 1 wherein M of formula (I) is selected from the group consisting of Si, Ti, Zr, Sn and Ce, and m is 4.

14. The multilayered article of claim 1 wherein M of formula (I) is selected from the group consisting of Al, B, $VO^{3+}$ and In, and m is 3.

15. The multilayered article of claim 1 wherein M of formula (I) is Zn, and m is 2.

16. The multilayered article of claim 1 wherein the hydrolysable radical R' of formulas (I) and (II) is selected from the group consisting of halogens, $C_{1-4}$alkoxy, $C_{6-10}$-aryloxy, $C_{1-4}$-acyloxy and alkylcarbonyl.

17. The multilayered article of claim 1 wherein formula (I) is selected from at least one tetraalkoxysilane.

18. The multilayered article of claim 1 wherein formula (II) is selected from at least one of glycidyloxy-propyl-trimethoxy-silane, methyltriethoxysilane and methacryloxypropyl-trimethoxysilane.

19. The multilayered article of claim 1 wherein after completion of the hydrolysis of the composition of the top layer coating composition a hydrolysis product is formed and, at least one of:
at least one additive selected from the group consisting of flow control agents, dyestuffs, stabilizers and inorganic fillers is added to the hydrolysis product; and
the concentration of the hydrolysis product is adjusted to 0.02 to 15 wt. % by adding at least one of alcohols and alkoxy-alcohols to the hydrolysis product.

20. The multilayered article of claim 1 wherein the scratch-resistant layer has a thickness of 0.5 to 30 μm.

21. The multilayered article of claim 1 wherein the top layer has a thickness of 0.1 to 3.0 μm.

22. The multilayered article of claim 1 further comprising a primer layer (P) interposed between said substrate and said scratch-resistant layer.

23. A process of preparing a multilayered article comprising the following steps:
(a) providing a substrate;
(b) forming a scratch-resistant layer by applying a scratch-resistant coating composition to a surface of said substrate, and partially curing the applied scratch-resistant coating composition, said scratch-resistant coating composition consisting of a polycondensate prepared from at least one silicon-containing compound, said polycondensate being prepared by a sol-gel process wherein said at least one silicon-containing compound is selected from the group consisting of 1) methylsilane; 2) methyltrimethoxysilane, methyltrihydroxysilane and mixtures thereof; 3) silyl acrylates according to the formula

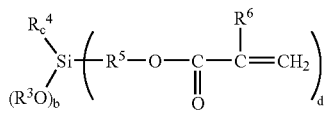

in which $R^3$ and $R^4$ are identical or different monovalent hydrocarbon radicals, $R^5$ is a divalent hydrocarbon radical having 2 to 8 carbon atoms, $R^6$ denotes hydrogen or a monovalent hydrocarbon radical, the index b is an integer having a value from 1 to 3, the index c is an integer having a value from 0 to 2 and the index d is an integer having a value of (4-b-c);
4) silylacrylates comprising nanoscale AlO(OH) particles; and
5) cyclic organosiloxanes according to the formula

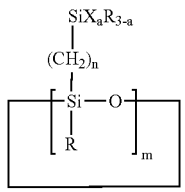

where m=3 to 6, R=$C_1$ to $C_8$-alkyl and/or $C_6$ to $C_{14}$-aryl, wherein the m-plurality of n's and R's within the molecule may be identical or different; and
(c) forming a top layer by applying a top layer coating composition to the scratch-resistant layer, said top layer coating composition being prepared by hydrolysing a composition consisting of
(i) at least one compound represented by general formula I, $$M(R')_m \qquad (I)$$

wherein M is an element or compound selected from the group consisting of Si, Ti, Zr, Sn, Ce, Al, B, $VO^{3+}$, In and Zn, R' represents a hydrolysable radical, and m is an integer from 2 to 4; and
(ii) optionally at least one compound represented by general formula II, $$R_b SiR'_a \qquad (II)$$

wherein the radicals R' and R are the same or different, R' is as defined for general formula (I), R represents a group selected from an alkyl group, an alkenyl group, an aryl group, a hydrocarbon group with at least one halogen group, an epoxide group, a glycidyloxy group, an amino group, a mercapto group, a methacryloxy group and a cyano group, and a and b independently of one another have a value from 1 to 3, provided that the sum of a and b is four and
(iii) optionally one or more additives selected from the group consisting of water, acid, solvent, dyestuffs, flow control agents, UV stabilizers, IR stabilizers, photoinitiators and photosensitizers; and
(d) curing said scratch-resistant and top layers with the proviso that when a compound of formula II is present, it is not a methyltrimethoxysilane or methyltrihydroxysilane.

24. The process of claim 23 further comprising drying the scratch-resistant layer at a temperature of greater than 110° C., after the application of the scratch-resistant coating composition to said substrate.

25. The process of claim 24 wherein the scratch-resistant coating composition comprises flow control agents present in an amount of 0.01 to 3.0 wt %.

26. The process of claim 24 wherein the top layer coating composition is applied at a relative humidity of 50 to 75%.

27. The process of claim 24 further comprising
curing the scratch-resistant layer,
activating the cured scratch-resistant layer by applying at least one of a corona treatment and a flame treatment to a surface of the cured scratch-resistant layer, and
applying said top layer coating to the activated scratch-resistant layer.

28. The process of claim 24 further comprising, applying a primer layer (P) to the substrate, and applying the scratch-resistant coating composition to the primer layer.

* * * * *